US012548586B2

(12) United States Patent
Jang et al.

(10) Patent No.: US 12,548,586 B2
(45) Date of Patent: Feb. 10, 2026

(54) AUDIO SIGNAL GENERATION MODEL AND TRAINING METHOD USING GENERATIVE ADVERSARIAL NETWORK

(71) Applicants: Electronics and Telecommunications Research Institute, Daejeon (KR); Industry-Academic Cooperation Foundation, Yonsei University, Seoul (KR)

(72) Inventors: In Seon Jang, Daejeon (KR); Seung Kwon Beack, Daejeon (KR); Jong Mo Sung, Daejeon (KR); Tae Jin Lee, Daejeon (KR); Woo Taek Lim, Daejeon (KR); Byeong Ho Cho, Daejeon (KR); Hong Goo Kang, Seoul (KR); Ji Hyun Lee, Seoul (KR); Chan Woo Lee, Seoul (KR); Hyung Seob Lim, Seoul (KR)

(73) Assignees: ELECTRONICS AND TELECOMMUNICATIONS RESEARCH INSTITUTE, Daejeon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 490 days.

(21) Appl. No.: 18/097,062

(22) Filed: Jan. 13, 2023

(65) Prior Publication Data

US 2023/0267950 A1 Aug. 24, 2023

(30) Foreign Application Priority Data

Feb. 22, 2022 (KR) ........................ 10-2022-0022925

(51) Int. Cl.
*G10L 25/51* (2013.01)
*G10L 25/30* (2013.01)

(52) U.S. Cl.
CPC .............. *G10L 25/51* (2013.01); *G10L 25/30* (2013.01)

(58) Field of Classification Search
CPC ................................ G10L 25/30; G10L 25/51
See application file for complete search history.

(56) References Cited

U.S. PATENT DOCUMENTS 9,852,745 B1 * 12/2017 Tootill ..................... G10H 1/00
10,552,711 B2 2/2020 Lim et al.
(Continued)

FOREIGN PATENT DOCUMENTS

EP 3 716 270 9/2020
KR 10-2085739 3/2020
(Continued)

OTHER PUBLICATIONS

Ryuichi et al (Parallel Waveform Synthesis Based on Generative Adversarial Networks with Voicing-Aware Conditional Discriminators); IEEE Xplore: May 13, 2021; DOI: 10.1109/ICASSP39728.2021.9413369.*
(Continued)

*Primary Examiner* — Oyesola C Ojo
(74) *Attorney, Agent, or Firm* — KILE PARK REED & HOUTTEMAN PLLC

(57) ABSTRACT

A generative adversarial network-based audio signal generation model for generating a high quality audio signal may comprise: a generator generating an audio signal with an external input; a harmonic-percussive separation model separating the generated audio signal into a harmonic component signal and a percussive component signal; and at least one discriminator evaluating whether each of the harmonic component signal and the percussive component signal is real or fake.

6 Claims, 9 Drawing Sheets

(56) References Cited

U.S. PATENT DOCUMENTS

| | | | | |
|---|---|---|---|---|
| 11,017,788 | B2 | 5/2021 | Huffman et al. | |
| 11,158,055 | B2 | 10/2021 | Lin et al. | |
| 2017/0249957 | A1 | 8/2017 | Park et al. | |
| 2017/0372724 | A1* | 12/2017 | Tootill | G10H 1/125 |
| 2018/0061438 | A1* | 3/2018 | Love | G06F 3/167 |
| 2019/0355347 | A1 | 11/2019 | Arik et al. | |
| 2021/0366461 | A1 | 11/2021 | Ahmed et al. | |
| 2022/0238131 | A1* | 7/2022 | Park | G06T 7/60 |
| 2023/0274758 | A1* | 8/2023 | Markhasin | G10L 25/06 704/232 |

FOREIGN PATENT DOCUMENTS

| | | |
|---|---|---|
| KR | 10-2020-0045976 | 5/2020 |
| WO | 2019/176950 | 9/2019 |

OTHER PUBLICATIONS

Yamamoto et al: "Parallelwaveform Synthesis Based on Generative Adversarial Networks With Voicing-Aware Conditional Discriminators," disarXiv:2010.14151v2, Apr. 26, 2021.

Driedger et al: "Extending Harmonic-Percussive Separation of Audio Signals," Proceedings of the International Conference on Music Information Retrieval (ISMIR), Jan. 2014.

* cited by examiner

AUDIO SIGNAL GENERATION MODEL AND TRAINING METHOD USING GENERATIVE ADVERSARIAL NETWORK

CROSS-REFERENCE TO RELATED APPLICATIONS

This application claims priority to Korean Patent Application No. 10-2022-0022925, filed on Feb. 22, 2022, with the Korean Intellectual Property Office (KIPO), the entire contents of which are hereby incorporated by reference.

BACKGROUND

1. Technical Field

The present disclosure relates to an audio signal generation model and a training method thereof and, more particularly, to a generative adversarial network-based audio signal generation model for generating a high-quality audio signal and a learning method thereof.

2. Related Art

The content described in this part simply provides background information on the present embodiment and does not constitute any conventional technology.

With the recent development of technology for artificial neural networks, attempts have been made to apply artificial neural networks to the generation of audio signals. In particular, studies are being actively conducted to improve the performance of audio signals generated through adversarial generation neural networks.

A generative adversarial network is a neural network composed of a generator for generating a signal and a discriminator for distinguishing the generated signal from the real signal and it aims to generate a signal close to the real signal by alternately training the generator and the discriminator. It has been proven that applying such an adversarial learning method to an acoustic signal generating device improves the objective and subjective quality scale of the generated signal.

However, the generative adversarial network-based method only proves its performance in generating a voice signal and has a limitation in showing limited performance for an audio signal with a more complex time-frequency configuration than the voice signal.

SUMMARY

The present disclosure has been conceived to solve the above problems of the conventional techniques, and it is an object of the present disclosure to provide a learning method capable of creating an audio generation model for the generator to generate a high-quality audio signal emphasizing harmonic and percussive components by allowing the discriminator of the generative adversarial network-based audio generation model to distinguish and discriminate between the harmonic and percussive component signals constituting the audio signal.

It is another object of the present disclosure to provide an audio generation model that enables the generator to generate a high quality audio signal emphasizing harmonic and percussive components by allowing the discriminator of the generative adversarial network-based audio generation model to distinguish and discriminate between the harmonic and percussive component signals constituting the audio signal.

According to a first exemplary embodiment of the present disclosure, a generative adversarial network-based audio signal generation model, executed by a processor to generate a high quality audio signal, may comprise: a generator generating an audio signal with an external input; a harmonic-percussive separation model separating the generated audio signal into a harmonic component signal and a percussive component signal; and at least one discriminator evaluating whether each of the harmonic component signal and the percussive component signal is real or fake.

The at least one discriminator may comprise: a first discriminator evaluating whether the harmonic component signal is real or fake; and a second discriminator evaluating whether the percussive component signal is real or fake.

The first and second discriminators may be composed of a convolutional neural network (CNN), the first discriminator having a receptive filed greater than the receptive field of the second discriminator.

The generator and the at least one discriminator may allow error backpropagation of a loss function.

The harmonic-percussive separation model may comprise: a short-time Fourier transform model converting the generated audio signal into a spectrogram; a harmonic masking model and a percussive masking model masking a harmonic component and a percussive component, respectively; and an inverse short-time Fourier transform module converting the masked spectrogram into the audio signal.

According to a second exemplary embodiment of the present disclosure, a learning method of a generative adversarial network-based audio signal generation model executed by a processor may comprise: (a) generating, by a generator, an audio signal; (b) separating the generated audio signal into a harmonic component signal and a percussive component signal using a harmonic-percussive separation model; and (c) evaluating, by at least one discriminator, whether each of the harmonic component signal and the percussive component signal is real or fake, wherein (a) to (c) are performed repeatedly for the generator and the discriminator to learn in a backward propagation manner.

The at least one discriminator may comprise: a first discriminator evaluating whether the harmonic component signal is real or fake; and a second discriminator evaluating whether the percussive component signal is real or fake.

According to a third exemplary embodiment of the present disclosure, an apparatus for generating an audio signal using a generative adversarial network may comprise: a memory configured to store at least one instruction; and a processor configured to execute the at least one instruction stored in the memory, wherein the at least one instruction is executed by the processor to train a generator by comparing a real audio signal and a signal generated by the generator using at least one discriminator learned using data used in extracting a harmonic component signal and data used in extracting a percussive component signal and to generate the audio signal using the learned generator.

The at least one discriminator may comprise a first discriminator and a second discriminator, the first discriminator being learned with the data used in extracting the harmonic component signal, and the second discriminator being learned with the data used in extracting the percussive component signal.

The first and second discriminators may be composed of a convolutional neutral network (CNN), the first discriminator having a receptive filed greater than the receptive field of the second discriminator.

The generator and the at least one discriminator may allow error backpropagation of a loss function.

The present disclosure is advantageous in terms of enabling the generator to generate an audio signal with better sound quality by allowing the discriminator of the generative adversarial network to separate and discriminate between the harmonic and percussive component signals constituting an audio signal.

The present disclosure is also advantageous in terms of capturing the complex structure of an audio signal by using two discriminators that distinguish and evaluate an input signal between the harmonic and percussive component signals.

In particular, the improvement in stability of the harmonic component of the generated signal over time makes it possible to expect a clear sound quality.

In addition, the adversarial learning method using two discriminators according to the present disclosure is advantageous in terms of allowing application of various generators due to no restriction in designing the generator and making it possible to expect continuous performance improvement by applying the improved generator.

DETAILED DESCRIPTION OF THE EMBODIMENTS

Figure 1:
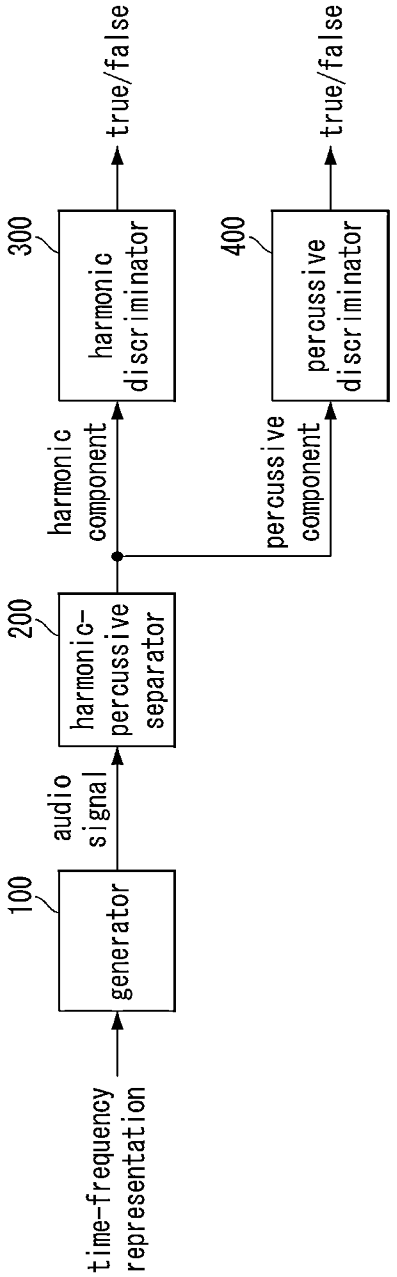
FIG. 1 is a block diagram of an audio generation model using a generative adversarial network according to an embodiment of the present disclosure.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram of an audio generation model using a generative adversarial network according to an embodiment of the present disclosure.

The audio generation model using the generative adversarial network includes a generator 100, a harmonic-percussive separation model 200, a harmonic discriminator 300, and a percussive discriminator 400. The generator 100, the harmonic-percussive separation model 200, the harmonic discriminator 300, and the percussive discriminator 400 are all designed as deep neural networks and may be trained simultaneously using an end-to-end learning method.

The generator 100 may generate a time domain audio signal corresponding to the information from a specific representation containing the potential information of the audio. Although a time-frequency representation of an audio signal is shown as the specific representation input to the generator 100, the present disclosure is not limited thereto, and any information capable of representing the characteristics of audio may be applied without any particular limitation. The generator 100 may be structured with any combination of various nonlinear functions such as a convolutional neural network, a recurrent neural network, and a multilayer perceptron. In addition, the generator 100 may adopt Parallel WaveGAN. However, as long as the error backpropagation from the loss function is possible, there are no specific restrictions on the structure of the generator 100.

Figure 2:
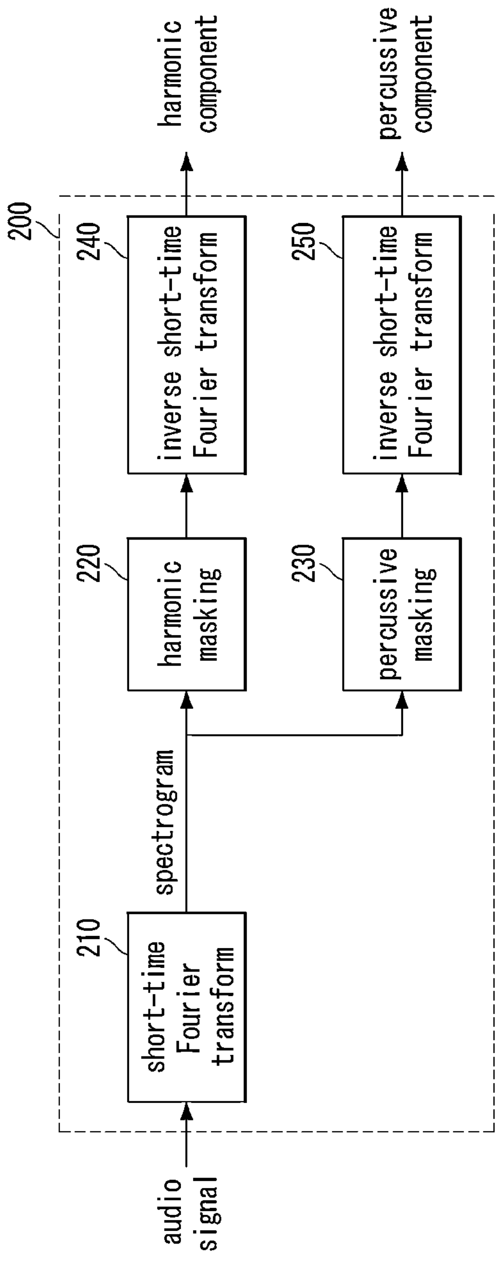
FIG. 2 is a block diagram of a harmonic-percussive separation model according to an embodiment of the present disclosure.

FIG. 2 is a block diagram of a harmonic-percussive separation model according to an embodiment of the present disclosure.

The harmonic-percussive separation model 200 may separate the audio signal generated from the generator 100 finally into a harmonic component signal and a percussive component signal and provide the separated signals to a harmonic discriminator 300 and a percussive discriminator 400 designed to suit the characteristics of respective component signals.

An audio signal may be divided into a harmonic component signal and a percussive component signal, and the harmonic component signal and the percussive component signal have different characteristics. The harmonic component signal has the characteristic of maintaining a quasi-stationary state for a predetermined time interval because it is made up of various multiples of a fundamental frequency. The percussive component signal has the characteristic of suddenly appearing in the form of noise and being attenuated within a short time in the time domain.

The harmonic-percussive separation model 200 may separate an audio signal having a complex structure into the harmonic component signal and the percussive component signal that have different characteristics. Then, the harmonic discriminator 300 evaluates the real/fake of the harmonic component signal, and the percussive discriminator 400 evaluates the real/fake of the percussive component signal such that the harmonic and percussive discriminators 300 and 400 can focus on the characteristics of respective components in evaluating the separated signals.

With reference back to FIG. 2, the harmonic-percussive separation model 200 may first transform the audio signal generated by the generator 100 into a spectrogram, a time-frequency domain representation, via a short-time Fourier transform model 210. The spectrogram may represent the harmonic and percussive components together.

The harmonic component signal may be extracted by multiplying the spectrogram by a harmonic mask in the harmonic masking model 220 and then performing the inverse short-time Fourier transform on the harmonic-masked spectrogram via the inverse short-time Fourier transform model 240. In addition, the percussive component signal may be obtained by multiplying the spectrogram by the percussive mask in the percussive masking model 230 and performing the inverse short-time Fourier transform on the percussive-masked spectrogram via the inverse short-time Fourier transform model 250.

Here, the harmonic mask and the percussive mask may contain information on the ratio of harmonic and percussive components included in the spectrogram. The harmonic and percussive masks may be extracted from an actual audio signal in advance using an existing signal processing algorithm before starting learning. Because there are only the Fourier transform and the inverse Fourier transform operations and per-element multiplication operations in the harmonic-percussive separation process, the error backpropagation to the generator can be achieved through the separator.

In addition to the above method, as long as backpropagation from the loss function can be performed to enable end-to-end learning including the generator 100 in the training process, various harmonic-percussive separation techniques can be applied.

Figure 3:
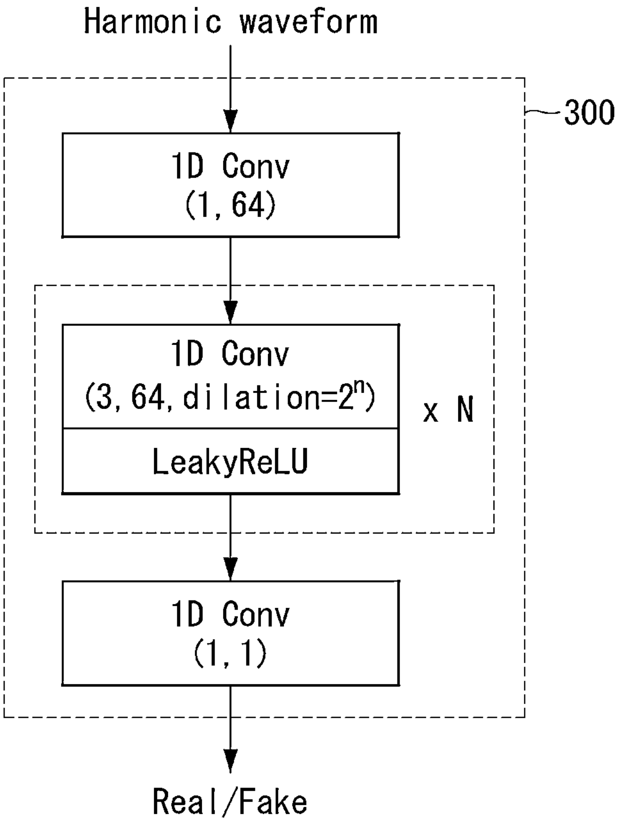
FIG. 3 is a block diagram of a harmonic discriminator according to an embodiment of the present disclosure.
Figure 4:
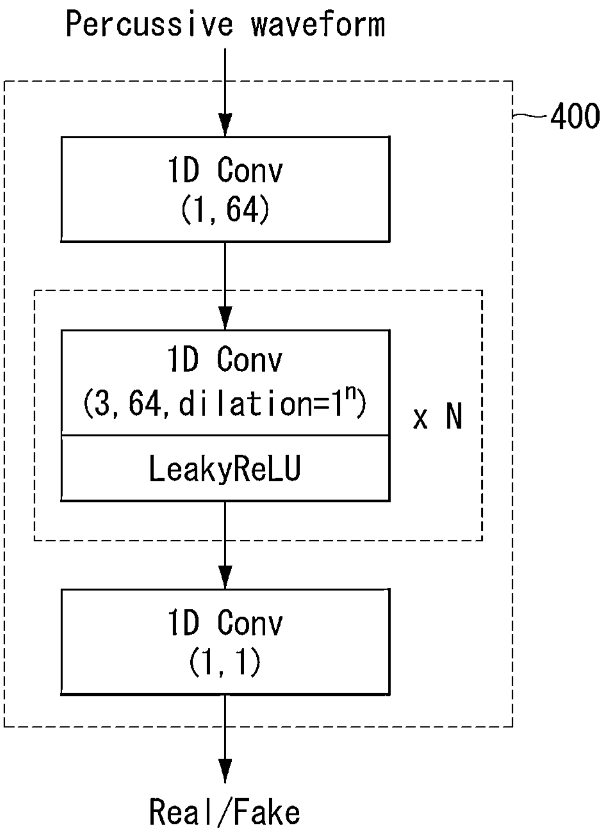
FIG. 4 is a block diagram of a percussive discriminator according to an embodiment of the present disclosure.

FIG. 3 is a block diagram of a harmonic discriminator according to an embodiment of the present disclosure, and FIG. 4 is a block diagram of a percussive discriminator according to an embodiment of the present disclosure.

According to an embodiment of the present disclosure, the discriminator of the present disclosure may include the two discriminators, i.e., the harmonic discriminator 300 and the percussive discriminator 400. The harmonic discriminator 300 and the percussive discriminator 400 may evaluate whether the harmonic component signal and the percussive component signal separated by the harmonic-percussive separation model 200 are similar to real signals, respectively. The harmonic discriminator 300 and the percussive discriminator 400 may be implemented via a convolutional neural network. The harmonic discriminator 300 and the percussive discriminator 400 may analyze the characteristics of the input signal while sequentially passing the input signal through the convolutional neural network and the activation function. Here, the activation function may be LeakyReLU.

The harmonic discriminator 300 and the percussive discriminator 400 of the present disclosure may have different receptive field sizes. The harmonic discriminator 300 and the percussive discriminator 400 may adjust the size of the receptive field by setting some elements differently within the basic discriminator structure. In more detail, the harmonic discriminator 300 requiring high frequency resolution may be set to have a large receptive field, and the percussive discriminator 400 requiring high temporal resolution may be set to have a small size receptive field.

The harmonic discriminator 300 and the percussive discriminator 400 may adjust the size of the receptive field by differently setting the kernel dilation factor of the convolutional neural network. With reference to FIGS. 3 to 4, the kernel dilation factors of the harmonic and percussive discriminators according to an embodiment of the present disclosure may be set to 2n and 1n, respectively. Here, n may mean the number of convolution layers constituting the discriminator. That is, the harmonic discriminator 300 may apply a large receptive field using a large dilation factor, and the percussive discriminator 400 may apply a small receptive field using a small dilation factor. Using the harmonic discriminator 300 and the percussive discriminator 400 set differently in the receptive field size as described above makes it possible for the generator 100 to determine the degree of distortion of the generated signal accurately, resulting in allowing the generator 100 to generate an audio signal having a much lower level of distortion in consideration of the characteristics of each of the harmonic component and the percussive component. In the above embodiment, as long as the condition for setting the size of the receptive field differently for the harmonic-percussive component is satisfied, there is no restriction on the structural design of the discriminator.

Training of the audio generating apparatus using the generative adversarial network according to an embodiment of the present disclosure is performed through end-to-end learning, and various loss functions can be adopted. However, it is inevitable to apply an adversarial loss function to the generator 100 and the discriminators 300 and 400. It is possible to additionally apply a restoration loss function to the generator 100 to help train the generated audio signal to be close to the real signal. As the restoration loss function, a function that minimizes the error between the samples of the real signal and the generated signal, such as a mean square error or a multi-resolution short-time Fourier transform loss function, may be used.

Here, in the case where the restoration loss function is applied to the generator 100, a time point at which the adversarial training starts can be freely set. However, in the case where it is required to start adversarial training after improving the performance of the generator 100, it is possible to first train the generator 100 using the restoration loss function and then start training the entire system including the discriminator.

Figure 5:
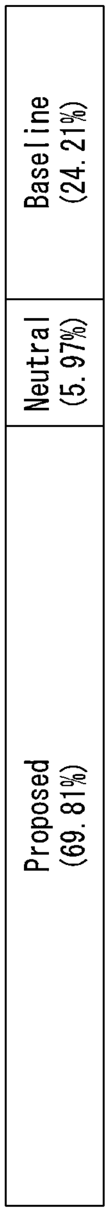
FIG. 5 is a diagram showing an ABX result for an audio signal generated according to an embodiment of the present disclosure.

FIG. 5 is a diagram showing an ABX result for an audio signal generated according to an embodiment of the present disclosure.

Here, ABX is an evaluation method in which objectivity and reproducibility called Double Blind Triple Stimulus with Hidden Reference are recognized. Here, "Proposed" represents a set of audio signals generated through a model designed according to the present disclosure, and "Baseline" represents a set of audio signals generated through a model to which one discriminator is applied without the harmonic-percussive separation model 200.

With reference back to FIG. 5, it is shown that the listening evaluators composed of experts judged that the signal generated by the present disclosure was similar to the original sound by 69.81% compared to the Baseline. That is, it is shown that, even if the same generator is used, dividing the input signal into a harmonic component and a percussive component through the harmonic-percussive separation model 200 and applying a discriminator suitable for each component has an excellent effect in restoring the audio signal.

Figure 6A:
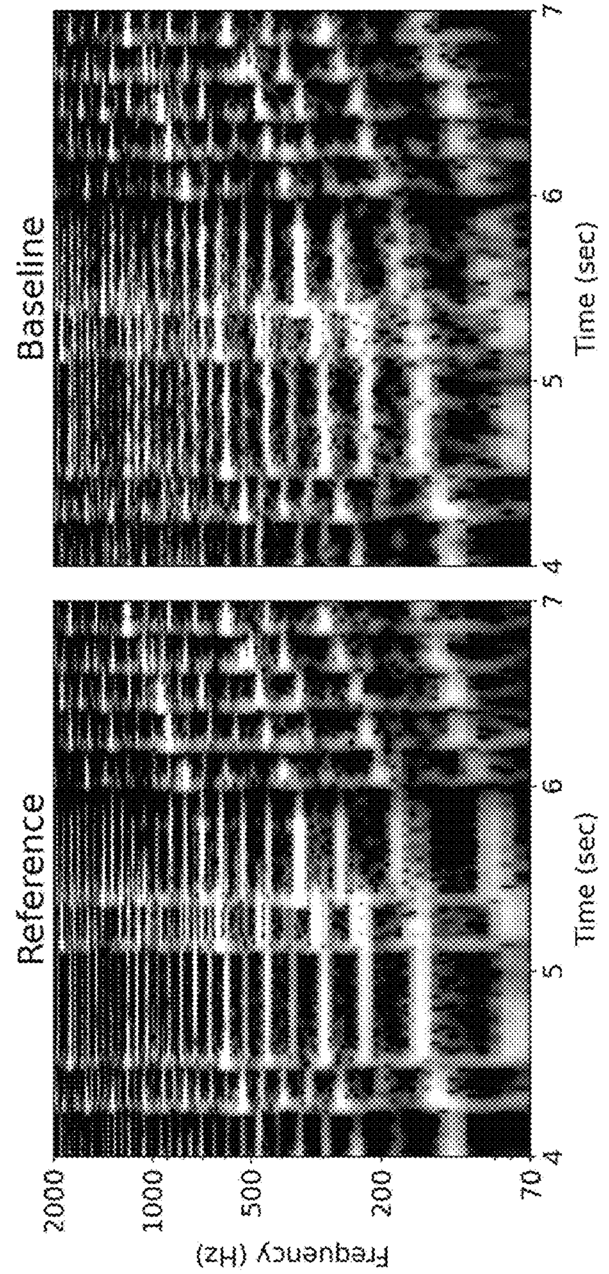
FIGS. 6A and 6B are spectrograms showing differences between an audio generated according to an embodiment of the present disclosure and a control group.
Figure 6B:
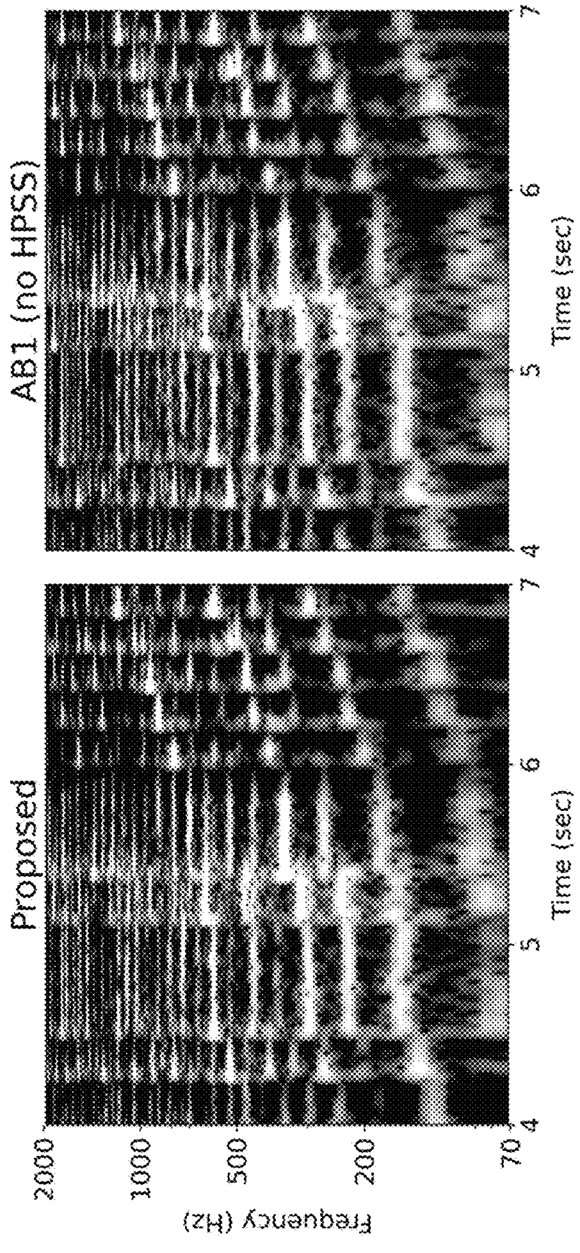
Figure 7A:
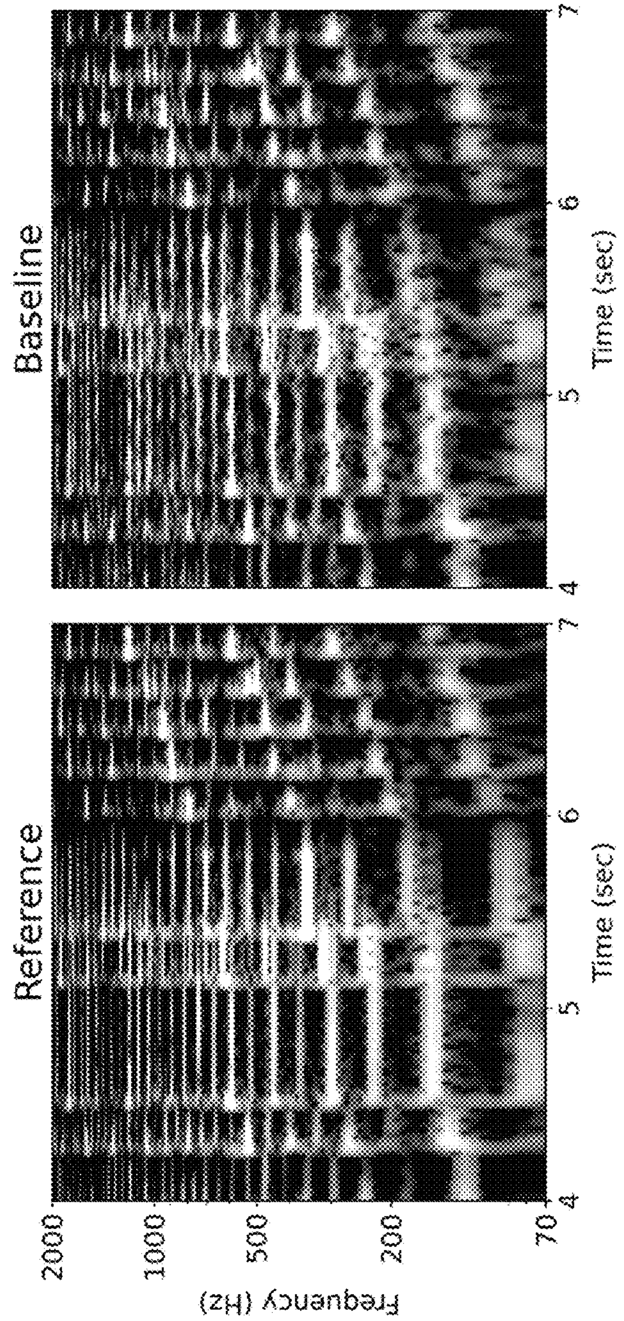
FIGS. 7A and 7B are spectrograms showing a difference according to a size of a receptive field of a discriminator according to an embodiment of the present disclosure.
Figure 7B:
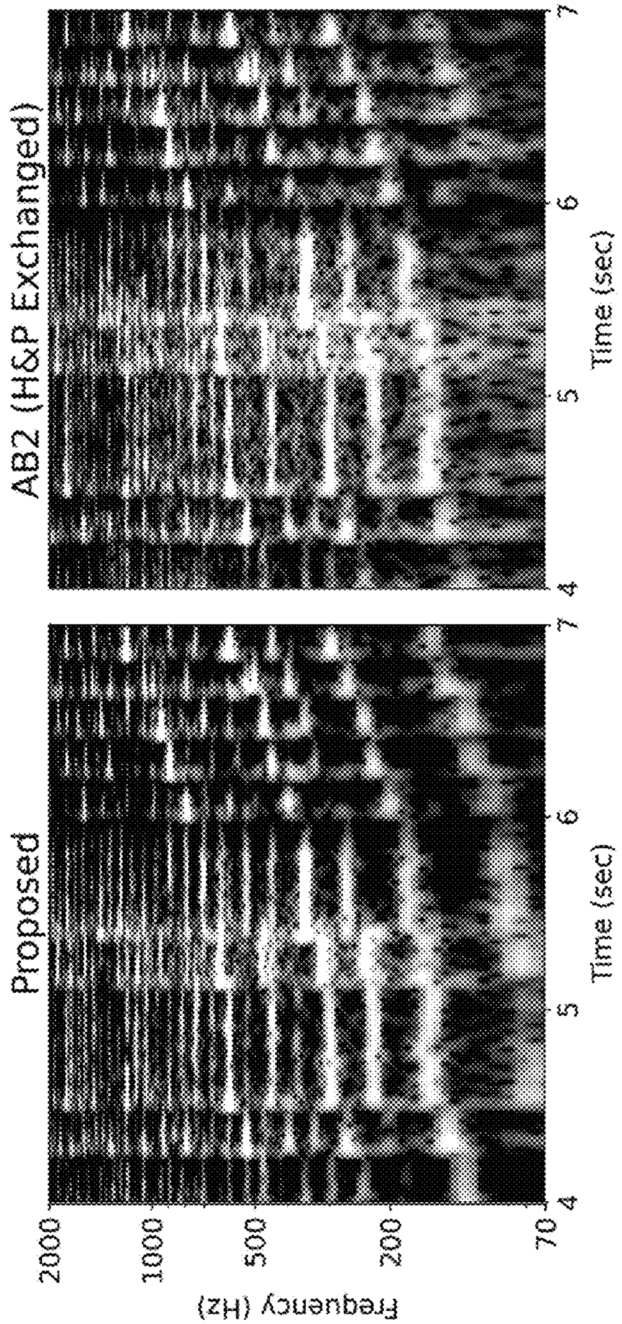

FIGS. 6A and 6B are spectrograms showing differences between an audio generated according to an embodiment of the present disclosure and a control group, and FIGS. 7A and 7B are spectrograms showing a difference according to a size of a receptive field of a discriminator according to an embodiment of the present disclosure.

Here, "Reference" represents the original, "AB1" represents a model adopting the same generator, harmonic discriminator 300 and percussive discriminator 400 as this invention without employing the harmonic-percussive separation model 200, and "AB2" represents a model having the same structure as this invention and set the sizes of receptive fields of the harmonic and percussive discriminators 300 and 400 oppositely.

With reference to FIGS. 6A and 6B, it is possible to see that the spectrogram according to the present disclosure is restored to be similar to the original compared to the baseline model and model AB1. In addition, the fact that the spectrogram of the restored signal of model AB1 model is unclear compared to the spectrogram of the present disclosure shows the effect of the presence or absence of the harmonic-percussive separation model 200. In addition, with reference to FIGS. 7A and 7B, given that the spectrogram of the restored signal of model AB2 has a large difference from the original signal compared to the present disclosure, it is possible to identify the effect of setting the receptive field of the harmonic discriminator 300 greater than the receptive field of the percussive discriminator 400.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A generative adversarial network-based audio signal generation model executed by a processor to generate a high quality audio signal, the audio signal generation model comprising:

- a generator generating an audio signal with an external input;
- a harmonic-percussive separation model separating the generated audio signal into a harmonic component signal and a percussive component signal;
- a first discriminator evaluating whether the harmonic component signal is real or fake; and
- a second discriminator evaluating whether the percussive component signal is real or fake,
- wherein the first discriminator has a first kernel dilation factor greater than a second kernel dilation factor of the second discriminator, and the first discriminator has a first receptive field greater than a second receptive field of the second discriminator,
- wherein the generator is trained to minimize errors between samples of real signals and audio signals generated by the generator, using a restoration loss function applied to the generator, in a first phase training, and
- wherein the generator, the harmonic-percussive separation model, the first discriminator, and the second discriminator are adversarial trained through end-to-end learning, after the first phase training, in a second phase training.

2. The signal generation model of claim 1, wherein the generator and the at least one discriminator allow error backpropagation of a loss function.

3. The signal generation model of claim 1, wherein the harmonic-percussive separation model comprises:

a short-time Fourier transform model converting the generated audio signal into a spectrogram;

a harmonic masking model and a percussive masking model masking a harmonic component and a percussive component, respectively; and an inverse short-time Fourier transform module converting the masked spectrogram into the audio signal.

4. A learning method of a generative adversarial network-based audio signal generation model executed by a processor, wherein the method comprising:

(a) generating, by a generator, an audio signal;

(b) separating the generated audio signal into a harmonic component signal and a percussive component signal using a harmonic-percussive separation model;

(c) evaluating, by a first discriminator, whether the harmonic component signal is real or fake, and (d) evaluating, by a second discriminator, whether the percussive component signal is real or fake, wherein the first discriminator has a first kernel dilation factor greater than a second kernel dilation factor of the second discriminator, and the first discriminator has a first receptive field greater than a second receptive field of the second discriminator, wherein the generator is trained to minimize errors between samples of real signals and audio signals generated by the generator, using a restoration loss function applied to the generator, in a first phase training, and wherein (a) to (d) are performed repeatedly for the generator, the harmonic-percussive separation model, the first discriminator, and the second discriminator to learn in a backward propagation manner for adversarial training through end-to-end learning after the first phase training, as a second phase training.

5. An apparatus for generating an audio signal using a generative adversarial network, the apparatus comprising:

a memory configured to store at least one instruction;

a processor configured to execute the at least one instruction stored in the memory, a generator generating an audio signal with an external input;

a harmonic-percussive separation model separating the generated audio signal into a harmonic component signal and a percussive component signal;

a first discriminator evaluating whether the harmonic component signal is real or fake; and a second discriminator evaluating whether the percussive component signal is real or fake, wherein the first discriminator has a first kernel dilation factor greater than a second kernel dilation factor of the second discriminator, and the first discriminator has a first receptive field greater than a second receptive field of the second discriminator, wherein the processor is configured to:

train the generator to minimize errors between samples of real signals and audio signals generated by the generator, using a restoration loss function applied to the generator, in a first phase training, and adversarial train the generator, the harmonic-percussive separation model, the first discriminator, and the second discriminator, through end-to-end learning, after the first phase training, in a second phase training.

6. The apparatus of claim 5, wherein the generator and the at least one discriminator allow error backpropagation of a loss function.

* * * * *